(12) United States Patent
Burk et al.

(10) Patent No.: US 7,981,199 B2
(45) Date of Patent: Jul. 19, 2011

(54) SORBER HEAT EXCHANGER WALL AND SORBER HEAT EXCHANGER

(75) Inventors: Roland Burk, Stuttgart (DE); Markus Watzlawski, Ostfildern (DE); Eberhard Zwittig, Hochdorf (DE)

(73) Assignee: Behr GmbH & Co. KG, Stuttgart (DE)

( * ) Notice: Subject to any disclaimer, the term of this patent is extended or adjusted under 35 U.S.C. 154(b) by 434 days.

(21) Appl. No.: 12/097,924

(22) PCT Filed: Dec. 8, 2006

(86) PCT No.: PCT/EP2006/011872
§ 371 (c)(1),
(2), (4) Date: Jun. 18, 2008

(87) PCT Pub. No.: WO2007/073849
PCT Pub. Date: Jul. 5, 2007

(65) Prior Publication Data
US 2008/0257530 A1 Oct. 23, 2008

(30) Foreign Application Priority Data

Dec. 19, 2005 (DE) .................. 10 2005 060 623
May 3, 2006 (DE) .................. 10 2006 020 794

(51) Int. Cl.
*F28D 17/00* (2006.01)
*B01D 53/04* (2006.01)
(52) U.S. Cl. ......................... 96/154; 165/133
(58) Field of Classification Search .............. 96/154; 62/324.1, 94, 476, 477, 55.5; 165/104.11, 165/133
See application file for complete search history.

(56) References Cited

U.S. PATENT DOCUMENTS

| 3,335,550 A * | 8/1967 | Stern ......................... 96/144 |
| 3,664,095 A * | 5/1972 | Asker et al. ................. 96/154 |
| 3,713,281 A * | 1/1973 | Asker et al. ................. 96/154 |
| 3,727,384 A * | 4/1973 | Feldman ..................... 96/131 |
| 5,000,007 A * | 3/1991 | Haefner ..................... 62/55.5 |
| 5,585,145 A | 12/1996 | Maier-Laxhuber et al. |
| 5,653,951 A * | 8/1997 | Rodriguez et al. ............ 423/439 |
| 6,412,295 B2 * | 7/2002 | Weiss et al. ................ 62/238.3 |
| 6,432,379 B1 * | 8/2002 | Heung ...................... 423/648.1 |
| 7,470,311 B2 * | 12/2008 | Sueoka et al. ............... 96/129 |
| 2005/0051294 A1 * | 3/2005 | Fujita et al. ................ 165/10 |

FOREIGN PATENT DOCUMENTS

| DE | 94 04 126 U1 | 6/1994 |
| DE | 44 05 669 A1 | 8/1995 |
| DE | 195 39 106 A1 | 4/1997 |
| DE | 198 11 302 C2 | 2/1999 |
| DE | 198 05 011 A1 | 8/1999 |
| DE | 693 27 664 T2 | 8/2000 |

(Continued)

*Primary Examiner* — Frank M Lawrence
(74) *Attorney, Agent, or Firm* — Muncy, Geissler, Olds & Lowe, PLLC

(57) ABSTRACT

The invention relates to a sorber heat exchanger wall comprising a fluid side (2) which is delimited by a fluid wall (4) and is impinged upon by a fluid releasing or absorbing heat, and a sorption side (5) that is provided with a sorption bed (6) with a sorbent (7) which accumulates a sorbate so as to absorb or release heat. In order to create a mechanically stable sorption wall that has good heat conducting and material conveying properties, the sorption bed (6) encompasses a highly heat conducting support structure (10,21) for the sorbent (7), which is connected to the fluid wall (4) in a heat conducting manner, and a hierarchical hollow space system.

14 Claims, 13 Drawing Sheets

FOREIGN PATENT DOCUMENTS

| | | |
|---|---|---|
| DE | 199 29 718 A1 | 12/2000 |
| DE | 199 49 638 A1 | 4/2001 |
| DE | 100 39 885 A1 | 2/2002 |
| DE | 101 41 524 C2 | 3/2003 |
| EP | 1 175 583 B1 | 1/2002 |
| EP | 1 239 240 A1 | 9/2002 |
| FR | 2 793 167 A1 | 11/2000 |
| JP | 2000-262892 A | 9/2000 |
| WO | WO 90/10491 A | 9/1990 |
| WO | WO 94/11685 | 5/1994 |

* cited by examiner

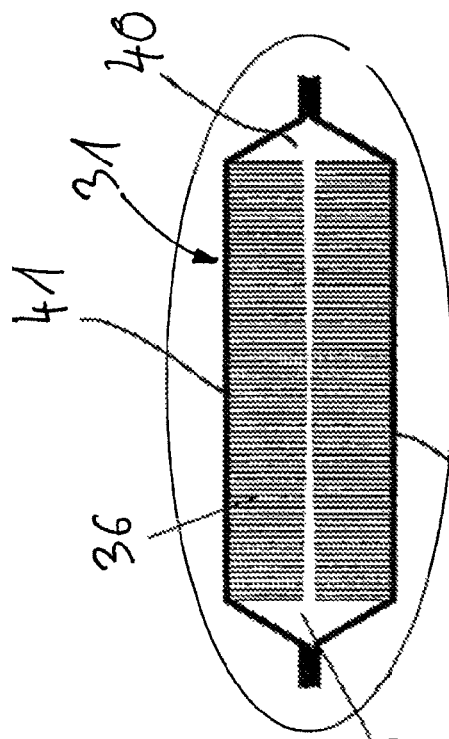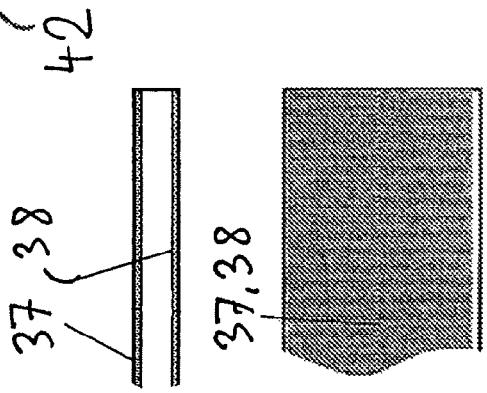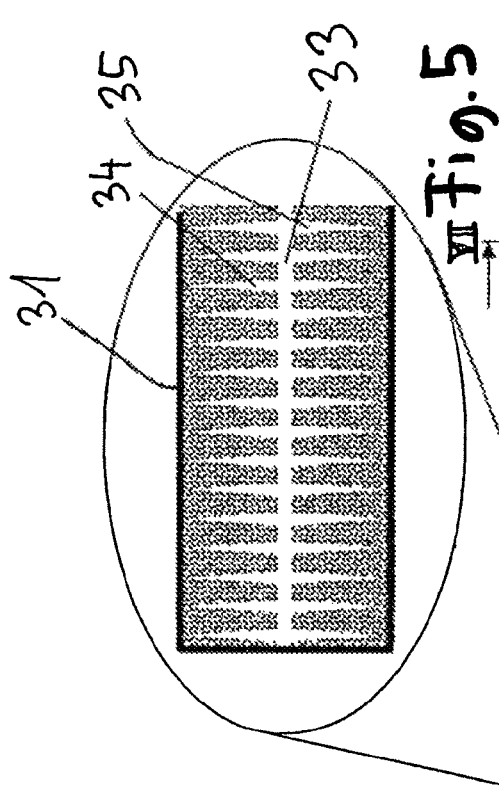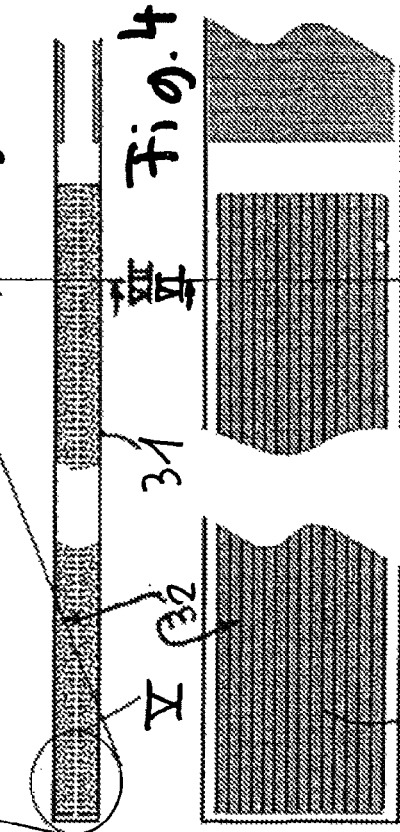

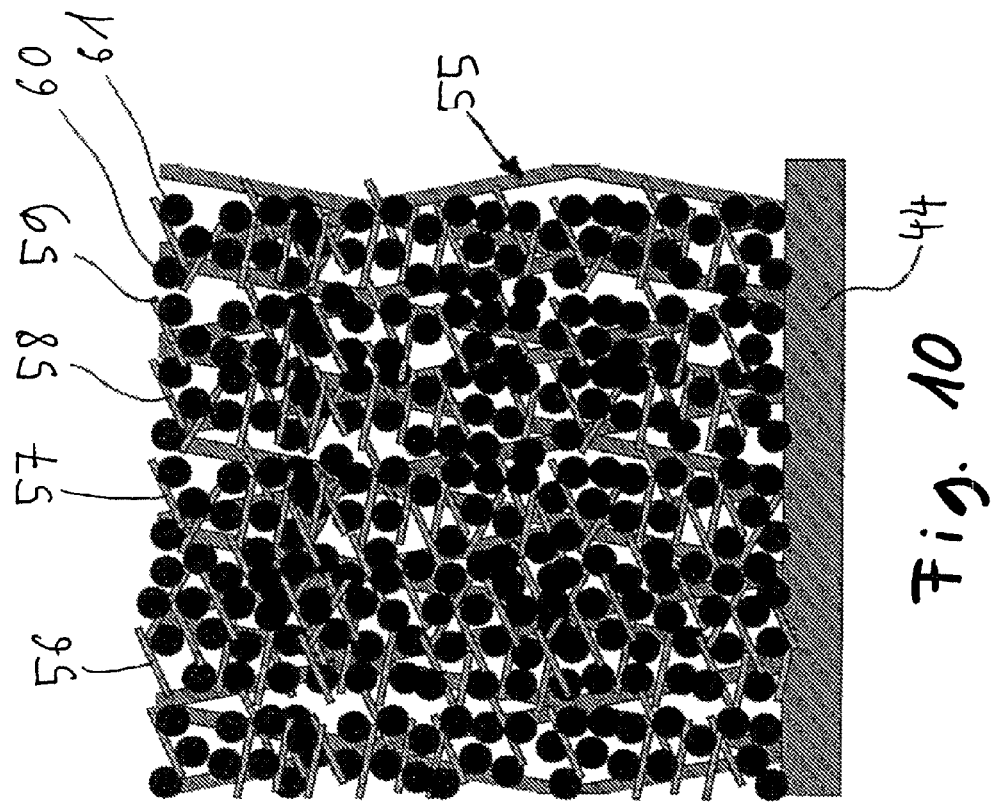
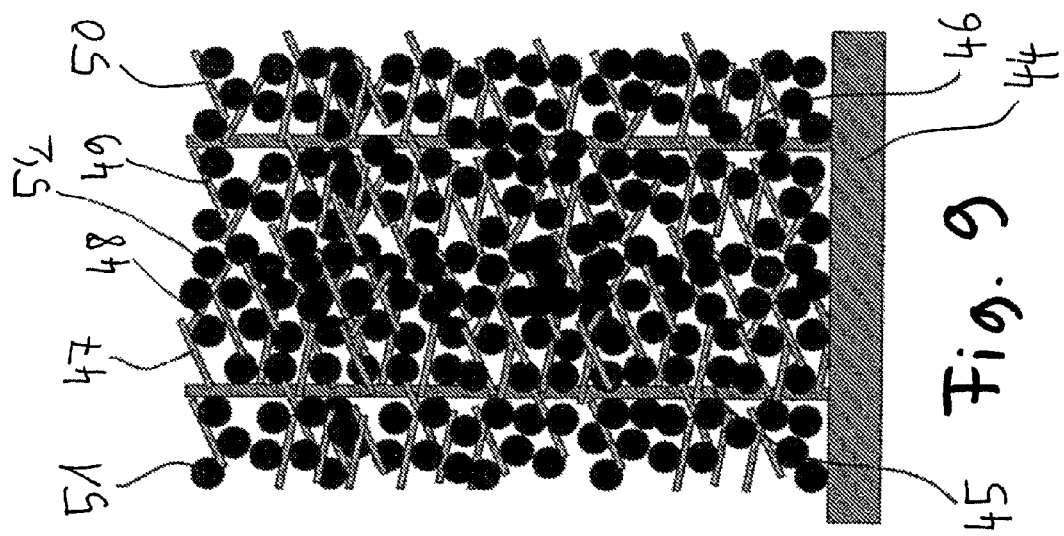

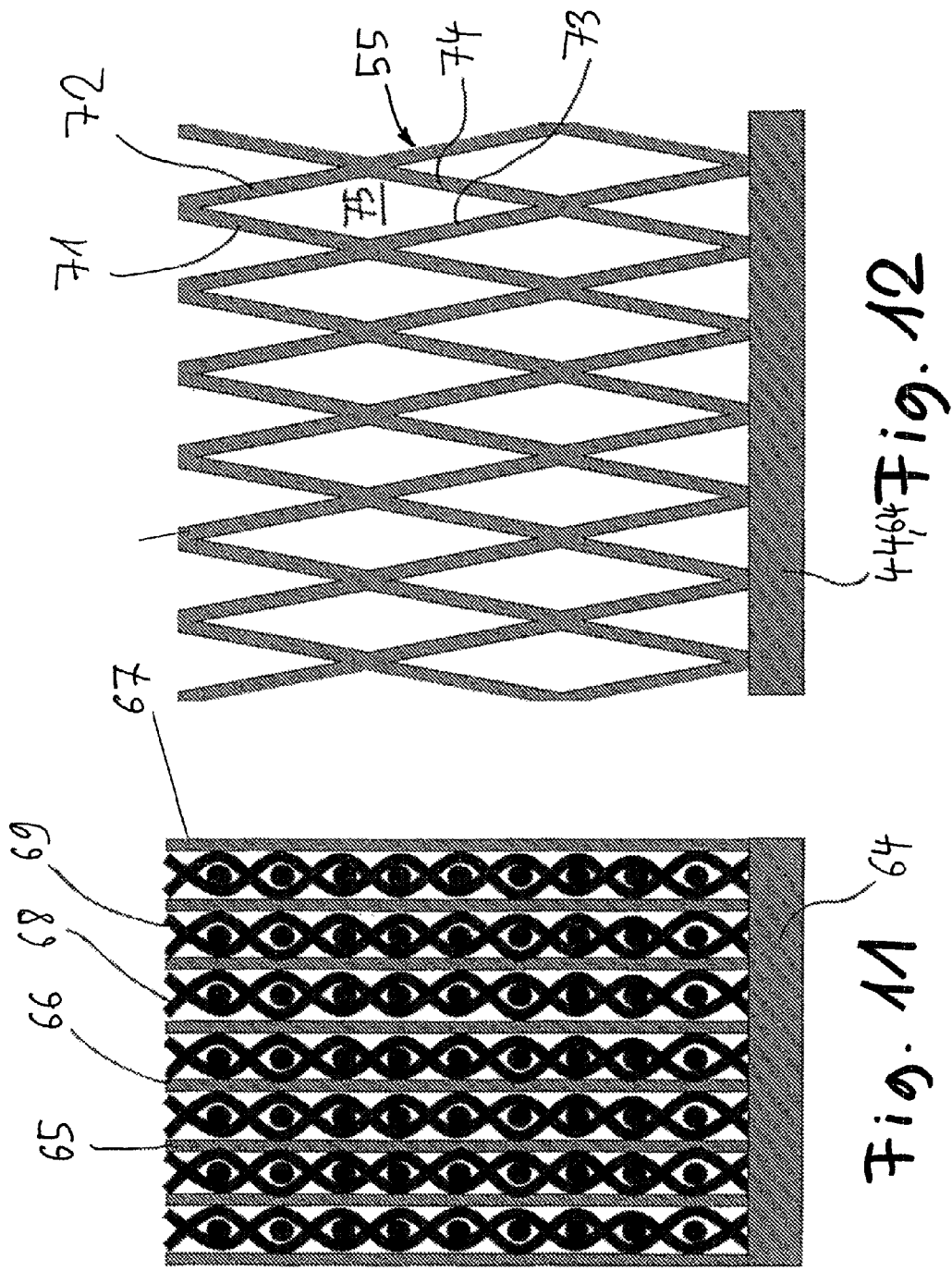

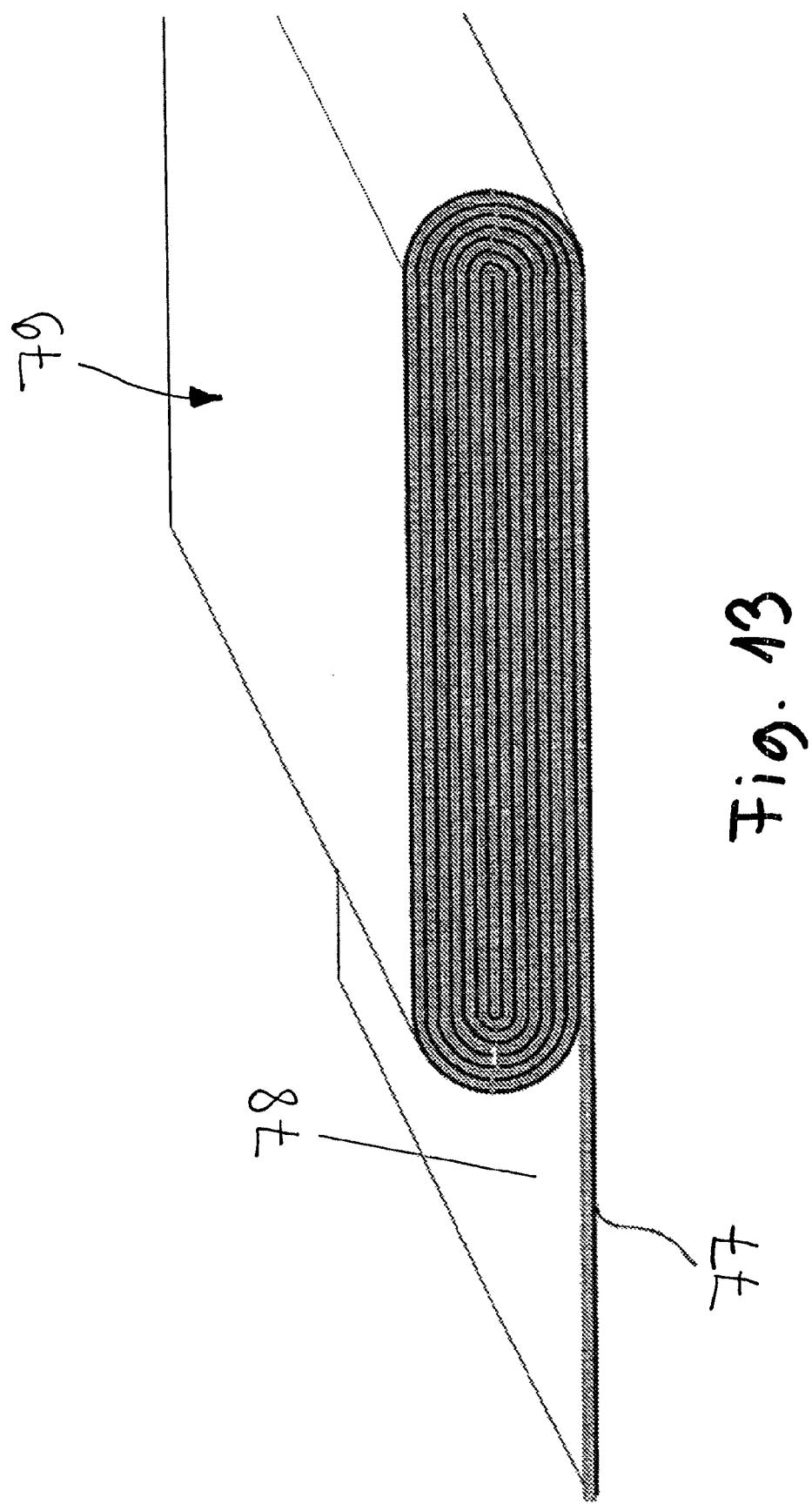

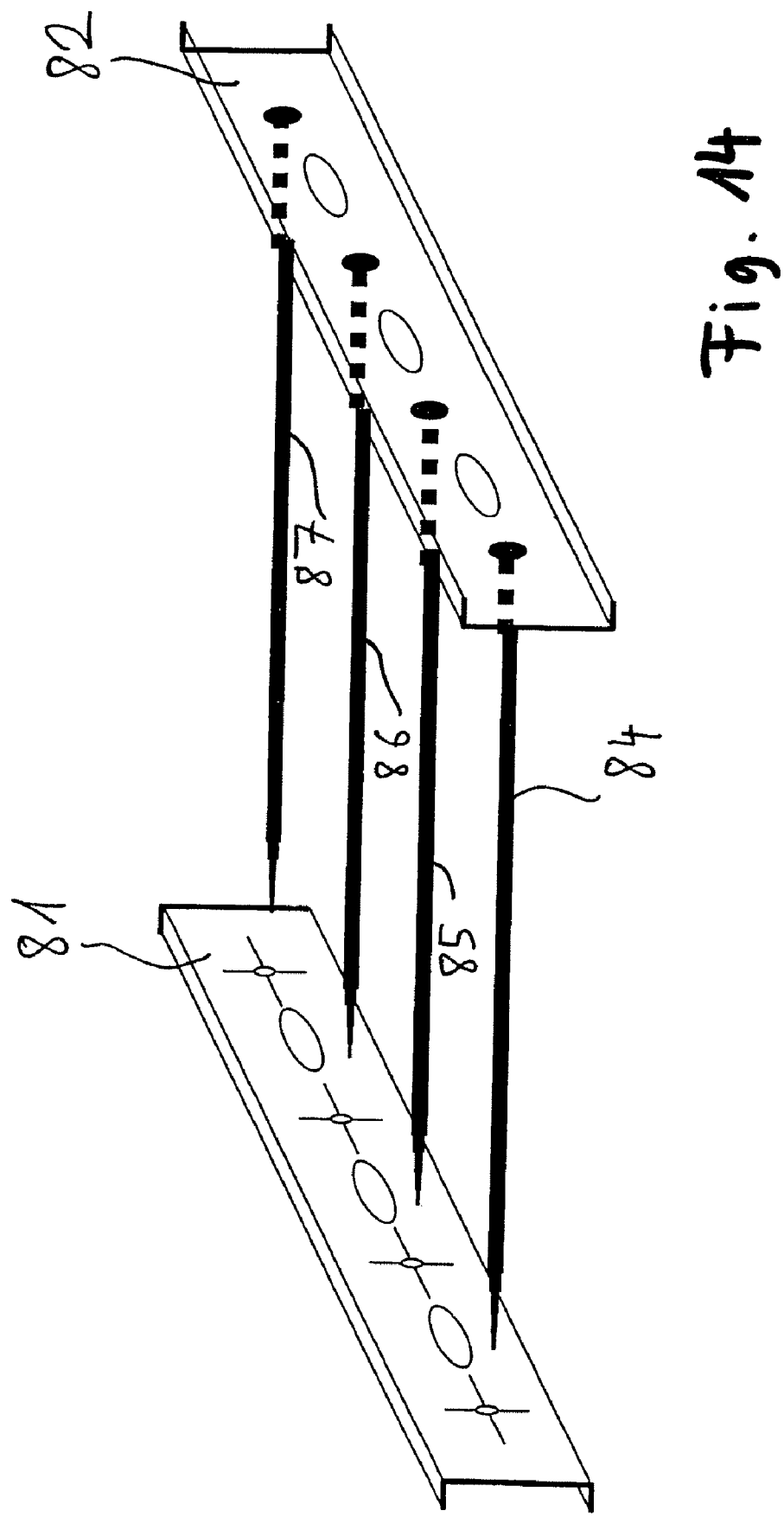

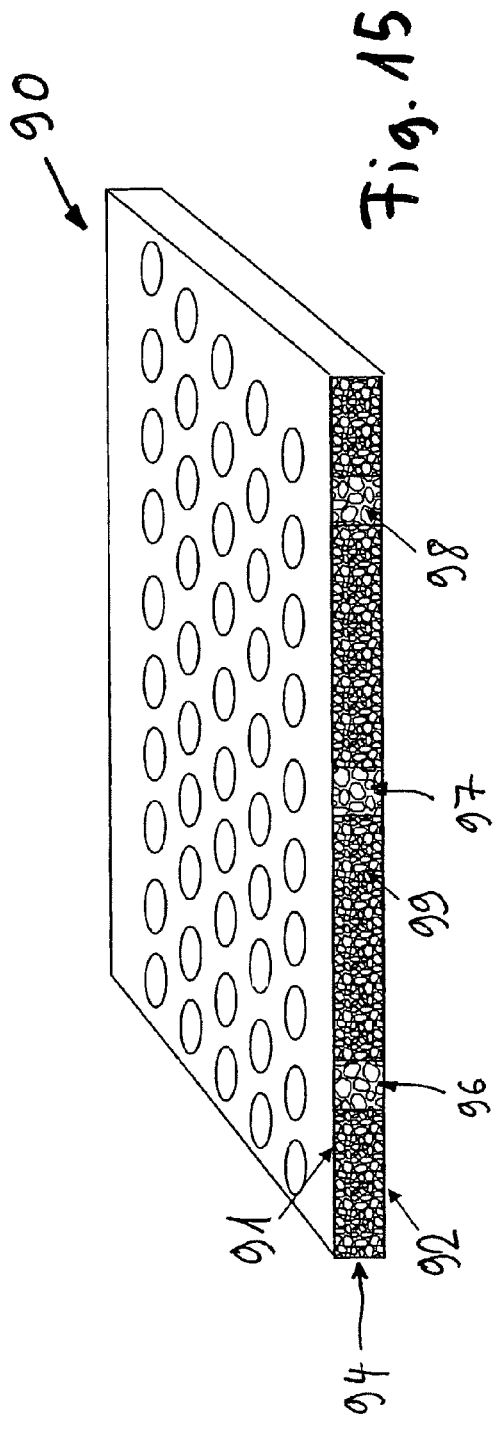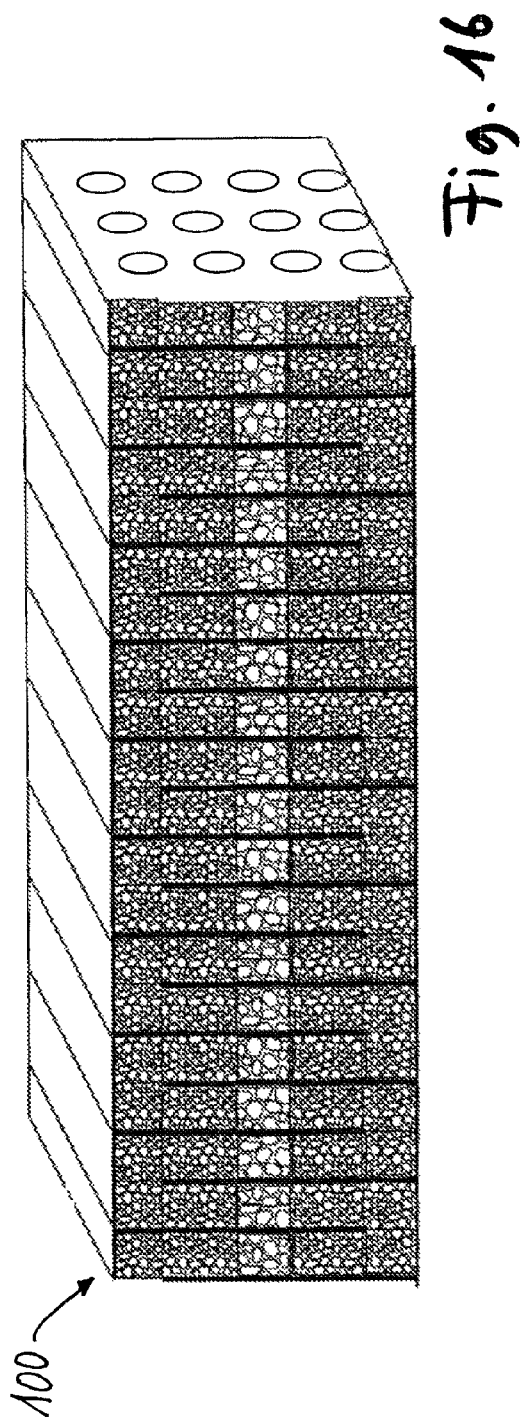

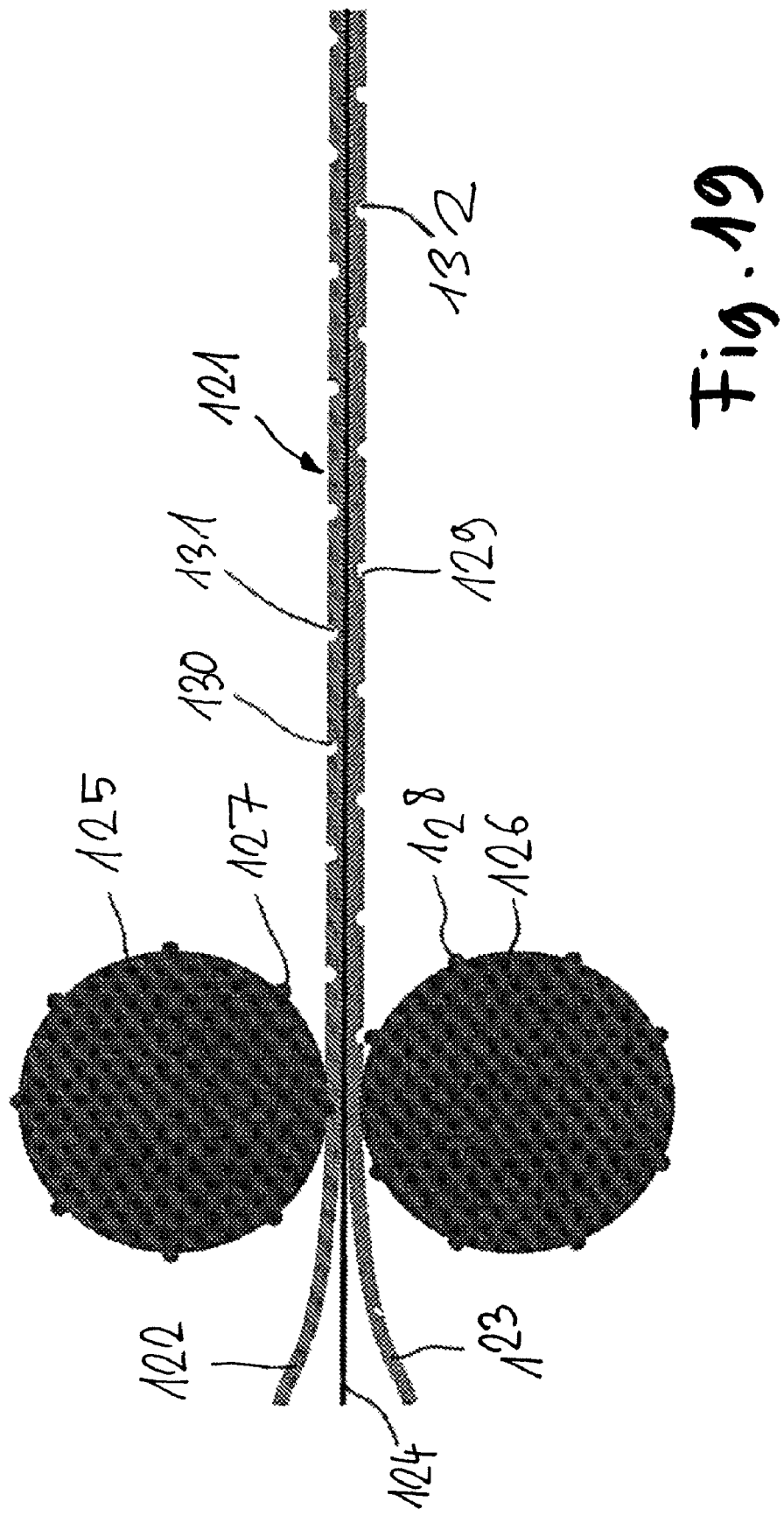

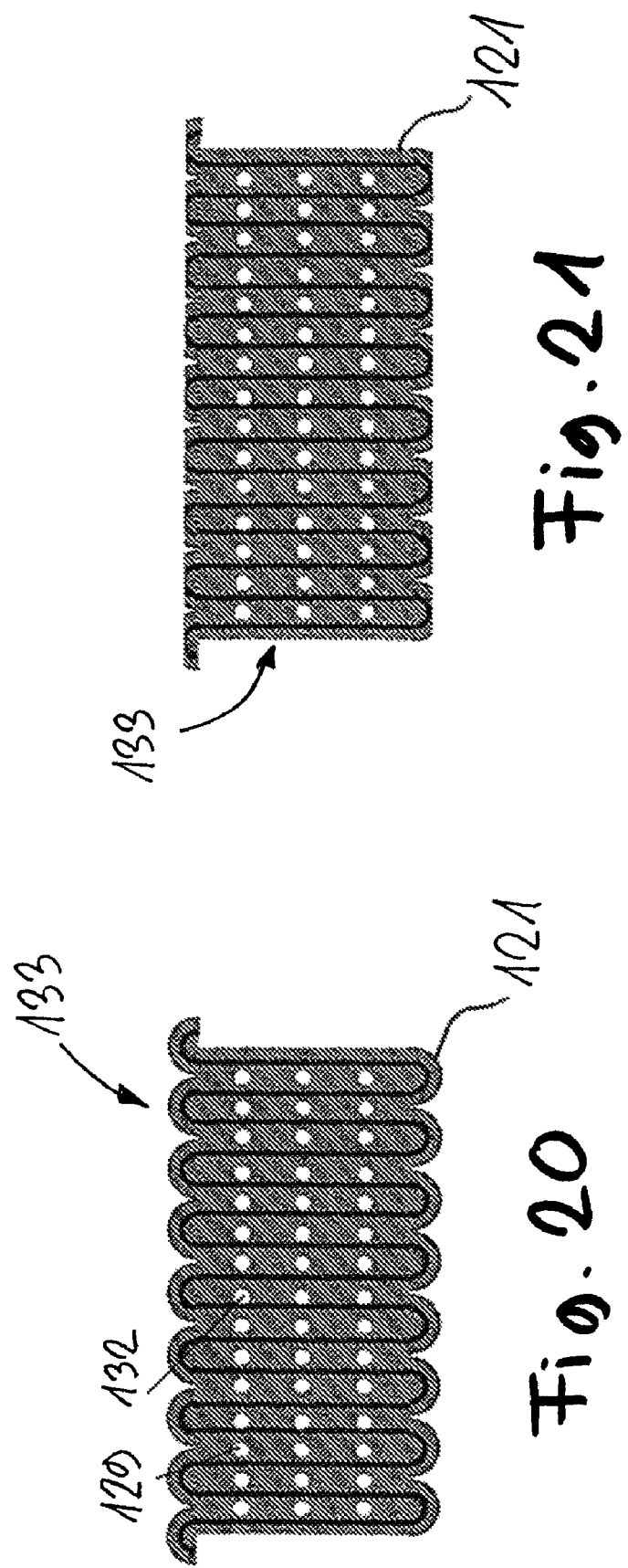

SORBER HEAT EXCHANGER WALL AND SORBER HEAT EXCHANGER

The invention relates to a sorber heat exchanger wall having a fluid side to which a heat-emitting or heat-absorbing fluid is applied and which is bounded by a fluid wall, and a sorption side which has a sorption bed with a sorbent which emits or accumulates a sorbate while absorbing or emitting heat.

European patent application EP 1 175 583 B1 discloses an absorber heat exchanger in which polar gas is repeatedly absorbed and desorbed at a complex connection. The known heat exchanger has, between at least some of the heat exchanger surfaces, a space which contains a sorbent/substrate composition which comprises a fibrous substrate material which is inert with respect to the polar gas or hydrogen. The fibrous substrate material comprises woven or nonwoven strands or fibers or combinations of woven and nonwoven strands or fibers. The absorbent is embedded in the fibrous substrate material.

The object of the invention is to provide a mechanically stable sorber heat exchanger wall, which sorber heat exchanger wall has good mass transfer and heat transport properties.

The object is achieved with a sorber heat exchanger wall having a fluid side to which a heat-emitting or heat-absorbing fluid is applied and which is bounded by a fluid wall, and a sorption side which has a sorption bed with a sorbent which emits or accumulates a sorbate while absorbing or emitting heat, in that the sorption bed comprises a supporting structure for the sorbent which is a good conductor of heat and which is connected to the fluid wall in a thermally conductive fashion. The present invention preferably relates to the adsorption, that is to say the reversible accumulation, of gases or dissolved materials on the surface of solid bodies. The sorber heat exchanger wall is preferably part of a sorber heat exchanger which is also referred to as a sorption reactor and can be developed to form an enclosed sorption pipe. The basis of a sorber heat exchanger is the reversible binding or accumulation of a gaseous working medium (sorbate) on a solid (sorbent) accompanied by the emission or absorption of heat. In order to feed in the streams of material into the solid or conduct them away out of the solid during the adsorption or desorption of the respective working medium with low losses, the solid should provide the gas space with the largest possible surface with short diffusion paths. Furthermore, it must be possible to carry away the generated thermal energy out of the solid or feed it into the solid as satisfactorily as possible. By connecting the thermally conductive supporting structure to the fluid wall it is possible, on the one hand, to achieve a high level of mechanical strength and, on the other hand, to make available a large macroscopic thermal contact area with the sorbent which is usually a poor conductor of heat. The structure according to the invention provides a good compromise between heat transport, mass transfer, adsorption capacity and the ratio of the active masses to the passive masses. In this context, a sufficient degree of mechanical durability is also ensured given the thermal stresses and vibrations which occur during operation, in particular in mobile applications. Furthermore, the thermally conductive supporting structure according to the invention can be manufactured cost-effectively and largely in an automated fashion.

A preferred exemplary embodiment of the sorber heat exchanger wall is characterized in that the thermally conductive supporting structure comprises a thermally conductive macro supporting structure. The macro supporting structure is preferably embodied and arranged in such a way that the entire space of the sorption bed is permeated. This macro supporting structure forms a coarse network for conducting heat from the fluid wall into the adsorber structure. As a result, large adsorber masses can be connected thermally to the fluid wall.

A further preferred exemplary embodiment of the sorber heat exchanger wall is characterized in that the macro supporting structure comprises an expanded metal mesh, a wire mesh and/or a perforated or nonperforated metal foil. It is essential that the macro supporting structure has a very good thermally conductive metallic skeleton structure.

A further preferred exemplary embodiment of the sorber heat exchanger wall is characterized in that the macro supporting structure comprises an expanded metal mesh with lozenge-shaped or hexagonal meshes. A rolled-flat extremely fine expanded metal mesh structure is particularly preferably used.

A further preferred exemplary embodiment of the sorber heat exchanger wall is characterized in that the meshes have a long axis which extends perpendicularly with respect to the fluid wall. As a result, the heat-conducting path can be kept short and at the same time easy manufacture is ensured.

A further preferred exemplary embodiment of the sorber heat exchanger wall is characterized in that the meshes have a web width of less than 1 mm, in particular of less than 0.5 mm. According to one aspect of the invention, the smallest possible web width is selected.

A further preferred exemplary embodiment of the sorber heat exchanger wall is characterized in that the expanded metal mesh is formed from a ribbon material which has a thickness of less than 0.5 mm, preferably of less than 0.2 mm, particularly preferably of less than 0.1 mm. The object of the invention is to use the smallest possible ribbon thickness in order to keep the passive masses as small as possible while ensuring that there is a sufficient conduction of heat and a mechanical reinforcing effect.

A further preferred exemplary embodiment of the sorber heat exchanger wall is characterized in that the ribbon material contains at least a copper and/or aluminum alloy. These materials provide the advantage that they are good conductors of heat.

A further preferred exemplary embodiment is characterized in that the sorber heat exchanger wall is formed from a pleated sandwich structure which is composed essentially of two thermally conductive films and an adsorber structure arranged between them. The intermediate adsorber structure can optionally have regions which promote axial vapor transport owing to a relatively permeable structure. The cover foils which are good conductors of heat can also have breakthroughs here for additional vapor transport.

A further preferred exemplary embodiment is characterized in that the adsorber structure is formed from a metallic planar carrier structure which is provided with a sorbent layer on both sides and which is shaped into a pleated structure and is connected at least at one end to the fluid wall in a thermally conductive fashion. In one particularly advantageous development of this embodiment, the pleated structure is also connected in a thermally conductive fashion to a fluid wall, lying opposite, of a sorption reactor or sorption pipe. For this purpose, a soldering process, welding process or bonding process is preferably used. In order to optimize the thermal contact with the fluid walls, the sorbent layer is preferably removed from the metallic carrier structure in the region of the contact face so that said carrier structure enters into direct metallic contact, and therefore thermally conductive contact, with the fluid walls, which is also a precondition for a subsequent soldering or welding process. In one development of this embodiment, the sorbent layers which bear against the metal foil on both sides have grooves or channels which extend transversely with respect to the rolling direction or fabrication direction and form, in their pleated form, vapor ducts which shorten the mass transfer through diffusion to the particles which are active in terms of sorption.

A further preferred exemplary embodiment of the sorber heat exchanger wall is characterized in that the thermally conductive supporting structure comprises a thermally conductive meso structure. This meso structure forms a second plane of a thermally conductive structure which directs the flow of heat from a macrostructure into the direct vicinity of the adsorbent particles in a finely distributed fashion. In a way which is analogous to the fractal structure of the system of blood vessels of an organism, this relatively fine structure further significantly shortens the heat conduction paths and therefore improves the thermal connection of each sorbent particle to the fluid wall. The thermally conductive meso structure is part of the sorbent structure in terms of manufacturing technology and is introduced together with it into the overall structure.

A further preferred exemplary embodiment of the sorber heat exchanger wall is characterized in that the thermally conductive meso structure contains carbon. The use of carbon-based adsorbents provides the advantage that given suitable, not excessively large activation the meso thermally conductive structure simultaneously forms the structures which are active in terms of sorption, for example by using partially activated carbon fibers (ACF), ACF felts or ACF wovens, which are to be preferably used.

A further preferred exemplary embodiment of the sorber heat exchanger wall is characterized in that conventionally granulated activated carbon is connected, together with carbon particles, carbon chips and/or carbon fibers, with a binder to form a coherent adsorber block which penetrates the macrostructure. The meso structure is formed here by the carbon particles which are configured for good thermal conduction. In one optional configuration of the embodiment, the carbon particles can be added in the form of what are referred to as "multiwalled carbon nanotubes" to the particles which are active in terms of sorption.

A further preferred exemplary embodiment of the sorber heat exchanger wall is characterized in that the thermally conductive meso structure is formed by what are referred to as graphite flakes. These therefore direct the coarsely distributed heat into direct contact with the adsorber particles.

A further preferred exemplary embodiment of the sorber heat exchanger wall is characterized in that the thermally conductive meso structure contains activated carbon fibers (ACF). The activated carbon fibers are preferably present in the form of felts or wovens.

A further preferred exemplary embodiment of the sorber heat exchanger wall is characterized in that the thermally conductive meso supporting structure is formed by added thin metal fibers which are good conductors of heat, said metal fibers being mixed with granulated activated carbon and connected with a binder to form a coherent adsorber block which penetrates the macrostructure.

A further preferred exemplary embodiment of the sorber heat exchanger wall is characterized in that the sorption bed has a sorbent structure or duct structure. The duct structure serves for mass transfer and is preferably of fractal configuration, in a way which is analogous to the bronchial system of a lung. The fractal configuration of the mass transfer path of the working medium molecules to the centers of the adsorption bed which are active in terms of sorption optimizes the mass transfer. In combination with one of the described heat transfer systems, which are also positioned next to one another in a fractal fashion, the overall kinetics of the sorber heat exchanger which is formed in this way are optimized. As a result, two independent fractal transfer systems or transfer systems which are positioned next to one another in a fractal fashion penetrate one another, in a way which is analogous, for example, with a lung in which two independent fractal transfer systems also penetrate one another.

In an exemplary embodiment of the sorber heat exchanger wall which is preferred for this purpose, a network of flow ducts extends through the sorbent structure. The flow ducts optimize the transport and the distribution of sorbent.

A further preferred exemplary embodiment of the sorber heat exchanger wall is characterized in that the network of flow ducts comprises relatively large flow ducts from which relatively small flow ducts extend. Branching preferably occurs from a network of large flow ducts to a network of relatively fine and ultimately extremely fine flow ducts. As a result, the pressure loss of sorbent which flows in and out is minimized with a minimized empty volume.

The invention also relates to a sorber heat exchanger having at least one sorber heat exchanger wall which has been described above.

Further advantages, features and details of the invention emerge from the following description in which various exemplary embodiments are described in detail with reference to the drawing, in which:

FIG. 3 shows an adsorption pipe with a heat exchanger wall according to the invention in a longitudinal section;

FIG. 4 shows the adsorption pipe from FIG. 3 in a further longitudinal section;

FIG. 5 shows an enlarged detail V from FIG. 4;

FIG. 6 shows a view of a section along the line VI-VI in FIG. 3;

FIG. 7 shows a view of a section along the line VII-VII in FIG. 4;

FIG. 8 shows an enlarged illustration of FIG. 7;

FIG. 9 shows a view of a section through a heat exchanger wall according to a further exemplary embodiment;

FIG. 10 shows a view of a further section through the heat exchanger wall from FIG. 9;

FIG. 11 shows a similar illustration to that in FIG. 9 according to a further exemplary embodiment;

FIG. 12 shows a view of a section through an expanded metal mesh which is connected to a fluid wall, in section;

FIG. 13 shows a schematic illustration of a wound sorption bed;

FIG. 14 shows a perspective illustration of a clamping device for a sorption bed;

FIG. 15 shows a sandwich structure formed from thermally conductive foils with an intermediately arranged adsorbent and regions of increased permeability to vapor for forming a sorption bed;

FIG. 16 shows a pleated sandwich structure for forming an alternative sorber heat exchanger wall;

FIG. 19 shows a schematic illustration of the design and of a preferred manufacturing method of a laminated ribbon for manufacturing an adsorber structure;

FIGS. 20 and 21 show side views of an adsorber structure which is manufactured from the laminated ribbon by pleating and application of a doctor blade.

Figure 1:
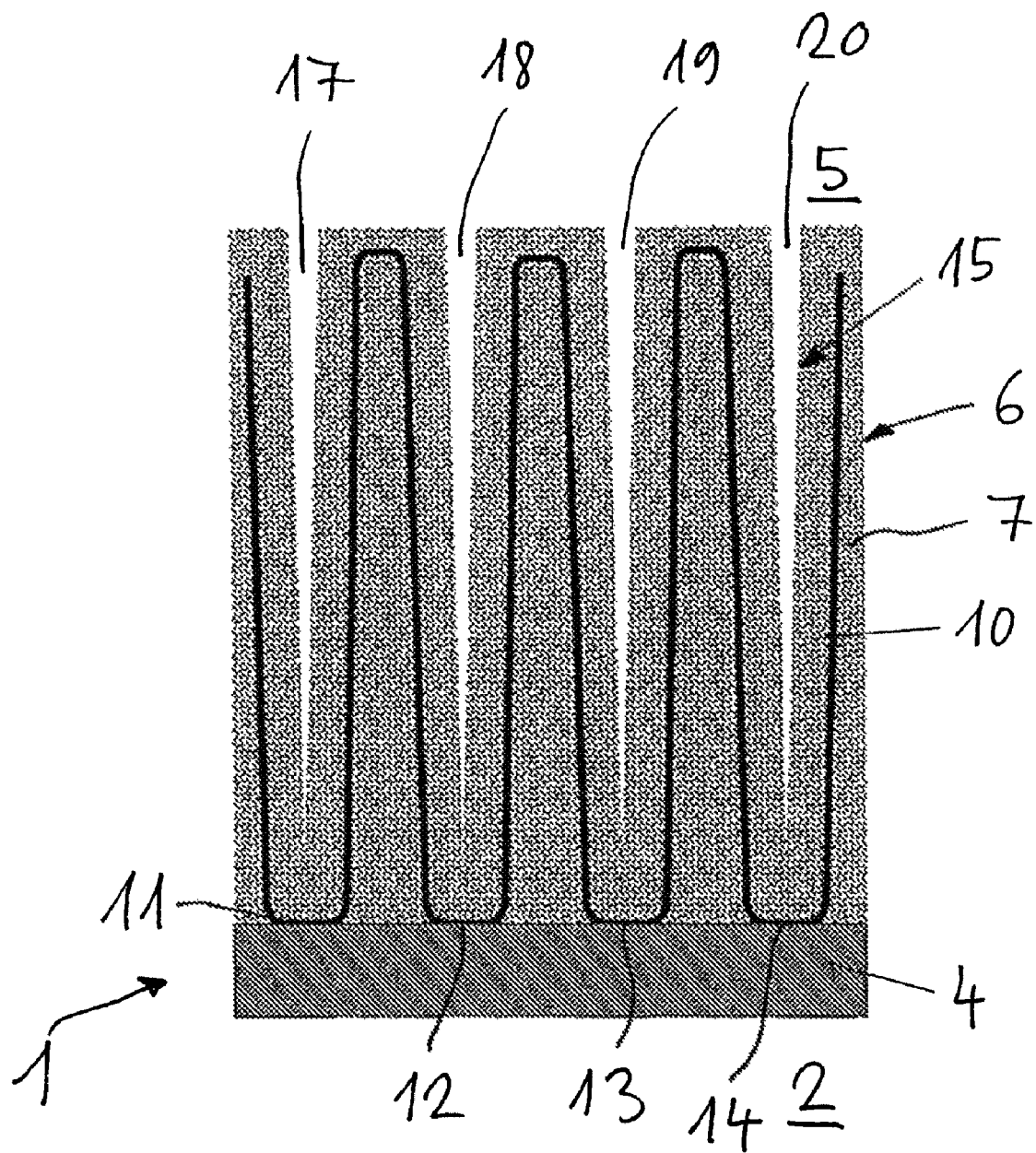
FIG. 1 shows a view of a section through a sorber heat exchanger wall according to a first exemplary embodiment.

FIG. 1 is a sectional illustration of a heat exchanger wall 1. The heat exchanger wall 1 is part of an adsorption reactor with a fluid side 2 which is bounded by a fluid wall 4. A fluid, such as for example water or air, flows past the fluid wall 4 on the fluid side Z and emits heat to the fluid wall 4. The fluid wall 4 is preferably formed from sheet metal. The sheet metal is, for example, sheet aluminum.

The side 5 of the heat exchanger wall 1 facing away from the fluid side 2 is referred to as sorption side. A sorption bed 6 is formed on the sorption side 5 of the heat exchanger wall 1. The sorption bed 6 contains a sorbent 7 which is attached to a thermally conductive supporting structure 10. The thermally conductive supporting structure 10 has an essentially crenellated structure when considered in section. The supporting structure 10 is connected in a materially joined fashion to the fluid wall 4 at a plurality of connecting points 11, 12, 13, 14. The supporting structure 10 is, for example, soldered, welded or bonded to the fluid wall 4 at the connecting points 11 to 14.

The thermally conductive supporting structure 10 is also referred to as a macro thermally conductive structure and comprises, for example, an expanded metal mesh, a wire mesh, perforated sheet metal, sheet metal and is preferably formed from a copper or aluminum alloy.

The sorbent 7 is provided with a sorbent structure 15 which comprises a plurality of flow ducts 17 to 20. The flow ducts 17 to 20 are in the shape of blind holes which are arranged perpendicularly with respect to the fluid wall 4 and run to a point. The sorbent structure 15 is also referred to as an adsorber structure and comprises, for example, carbon fiber felt, carbon fiber woven or a bed of bound activated carbon.

Figure 2:
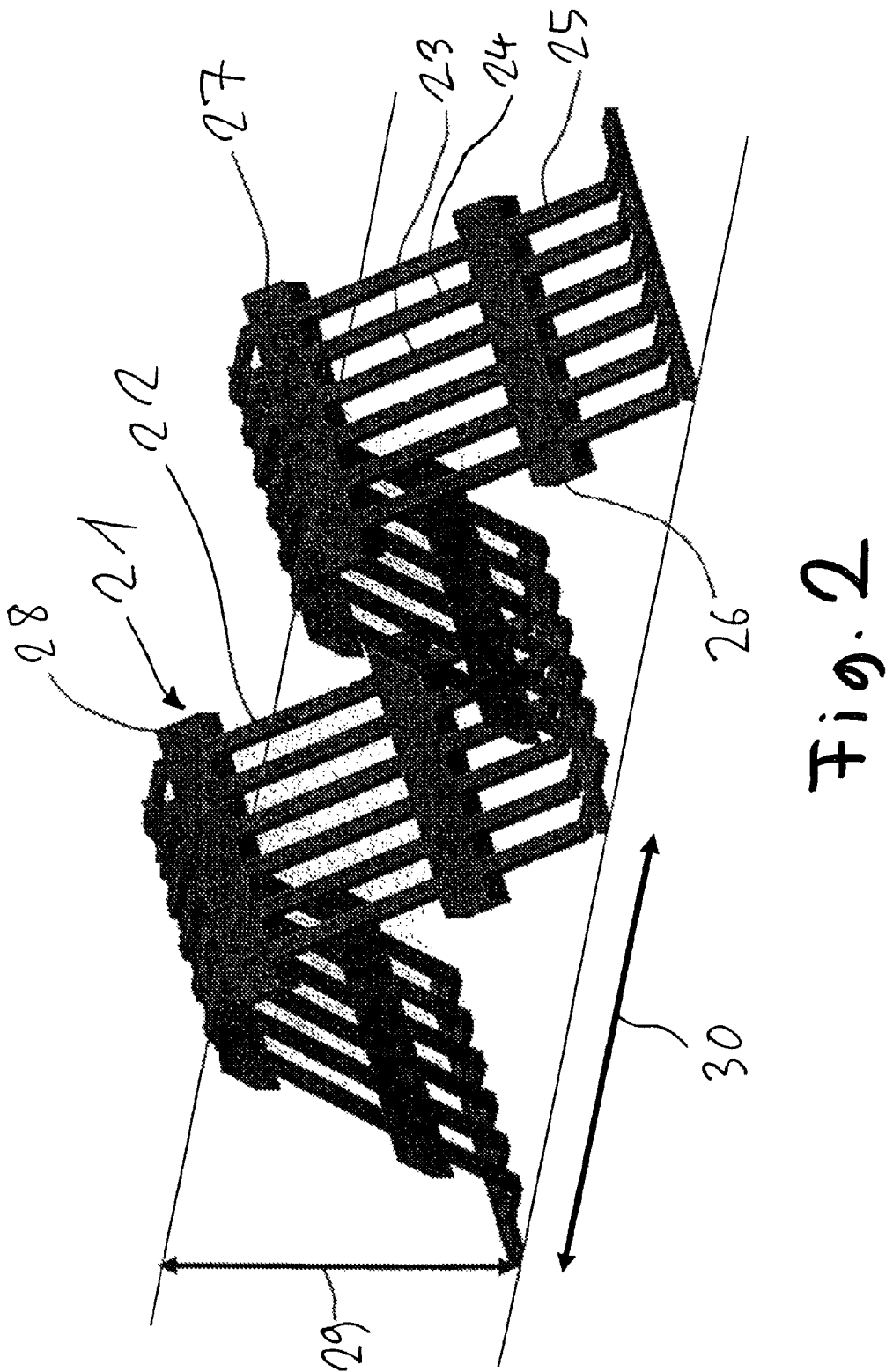
FIG. 2 shows a perspective illustration of a thermally conductive supporting structure.

FIG. 2 is a perspective illustration of a thermally conductive supporting structure 21. The thermally conductive supporting structure 21 is formed by a zigzag-shaped metal mesh 22 which has a plurality of longitudinal webs 23 to 25 which are connected to one another by means of transverse webs 26 to 28. The mesh 22 has a pleating height 29 and a pleating density 30. The thermally conductive supporting structure 21 is formed from a highly thermally conductive alloy, preferably a copper or aluminum alloy, and constitutes a thermally conductive reinforcing structure for an adsorption bed which is to be applied in a subsequent process. The adsorption bed (not illustrated) is introduced into the primary reinforcing structure in the form of a highly viscous or pasty mass or a bed in such a way that the cavities between the metal webs 23 to 28 are filled in virtually completely and they are surrounded by the adsorber composite composition. This composite composition or bed is then hardened or bound to form a solid.

The adsorber composite composition preferably comprises adsorber particles (for example activated carbon, zeolite, silica gel, metal hydride), a binding agent and optionally a filler which is a good heat conductor, such as carbon fibers, graphite particles (flakes), metal fibers or the like. The adsorber composite composition optionally and preferably has a meso porous structure in the sense of a fractal model, which structure facilitates mass transfer into deeper layers of the structure by virtue of the fact that the mass or bed still contains gas cavities between the particles. Furthermore, the structure can also have additional macrostructures such as slots, gaps or blind holes which are formed by expulsion measures or shaping measures before the overall structure hardens. In this way, a hierarchical (fractal) pore system is generated which branches from large cross sections (longitudinal ducts, blind holes, slots) to ever smaller cross sections (intermediate spaces between sorption particles) and ultimately to the inner particle macropores and finally to the meso pores and micropores which are active in terms of sorption.

The geometric dimensioning of the individual structures is determined here, on the one hand, in accordance with the selection of the pair of materials, in particular the material data of the working medium used (vapor pressure, density, viscosity, diffusion coefficients) and, on the other hand, in accordance with the thermal conduction properties of the structures used. According to the selection of the pair of working materials it is possible to determine the optimum geometric parameter combination for the entire structure for the structures used at the macro level, meso level and micro level by means of a detailed equivalent model for the heat transport and mass transfer.

FIGS. 3 to 8 comprise various views of an adsorption pipe 31 which is hermetically sealed on all sides and is constructed of half-shells. The adsorption pipe 31 comprises an adsorption bed 32 with an adsorber structure. The adsorber structure is, for example, a fixed bed made of granulated activated carbon. The adsorber structure comprises, as is shown in FIG. 5, a main flow duct 33 from which a plurality of secondary flow ducts 34, 35 branch off. The secondary flow ducts 34, 35 are arranged perpendicularly with respect to the main flow duct 33. Toward the outside the secondary flow ducts 34, 35 run to a point.

The adsorber structure is applied to a supporting structure 36. The sorption pipe 31 also comprises capillary structures 37, 38 which serve to receive condensed fluid. When heating occurs, gas is driven out of the sorption bed 32 and condenses on or in the capillary structures 37, 38. In the enlarged illustration in FIG. 8, it is apparent that the sorption pipe 31 is formed from two half-shells 41, 42 which are connected to one another in a materially joined fashion at the connecting points. In the proximity of the connecting points, the half shells 41, 42 have further main flow ducts 39, 40 with a triangular cross section.

FIGS. 9 and 10 comprise various views of a sorber heat exchanger wall according to a further exemplary embodiment. Mesh webs 45, 46 extend perpendicularly upward from a fluid wall 44. The mesh webs 45, 46 form a macro supporting structure to which a plurality of fibers 47 to 50 are attached. The fibers 47 to 50 form a thermally conductive meso supporting structure which is in turn connected to a fixed bed composed of a plurality of spheres 51, 52 of sorbent.

FIG. 10 shows that the webs (45, 46 in FIG. 9) are associated with an expanded metal mesh 55. Further fibers 56 to 59 are connected to the expanded metal mesh 55. The further fibers 56 to 59 in turn serve for connecting to further graphite spheres 60, 61.

FIG. 11 is a sectional illustration of a heat exchanger wall according to a further exemplary embodiment. A plurality of thermally conductive webs 65, 66 of a thermally conductive supporting structure extend from a fluid wall 64. Woven fabrics 68, 69 composed of activated carbon fibers are arranged between the thermally conductive webs 65, 66.

FIG. 12 shows that the thermally conductive webs (65, 66 in FIG. 11) are thermally conductive meshes 55 as shown in FIG. 10. In the expanded metal mesh 55, in each case four webs 71 to 74 form a lozenge 75. The adsorber structure is therefore formed in this case by an alternating stack of thermally conductive meshes and activated carbon fiber woven fabrics, and said stack is connected at the end side in a thermally conductive fashion to the wall of the sorber heat exchanger.

In FIG. 13 it is indicated that it is also possible to wind expanded metal meshes 67 with an adsorber structure which is applied in a planar fashion, for example in the form of a woven fabric made of activated carbon fibers, onto a ball 79. Such a ball 79 can be connected at the ends to a fluid wall.

The manufacture of such sorption beds is preferably carried out by layering supporting structures and activated carbon fiber woven fabrics. The stacks which are layered one on top of the other are then pressed in order to increase the packing density. By selecting the woven thickness, type of binding, mesh thickness and compression of the stack it is possible to set a plurality of parameters to an optimum. In order to increase the possible adsorber packing density and improve the thermal contact with the thermally conductive structures it is possible to provide aids, for example corresponding to FIG. 14, which maintain the desired packing density of the stack. These aids are composed, as shown, of end plates and ties, for example in the form of thin connecting pins. Corresponding structures are known. Bonding methods, soldering methods and welding methods are possible for the thermally conductive connection to the fluid wall. Preferred methods are resistance soldering or resistance welding by means of capacitor discharge.

FIG. 15 shows the design of a sandwich structure with two cover layers which are good thermal conductors and are in the form of metal foils, and with an adsorbent layer arranged between them. The adsorbent layer can have regions with increased permeability to vapor here. If activated carbon woven fabric is used, this can be brought about, for example, by correspondingly adapting the type of binding.

FIG. 16 shows how a folded adsorber structure is formed from the sandwich structure by pleating. The regions with increased porosity for improving the mass transfer are spaced apart here in such a way that a corresponding flow duct with reduced transport losses is formed in each fold.

Figure 17:
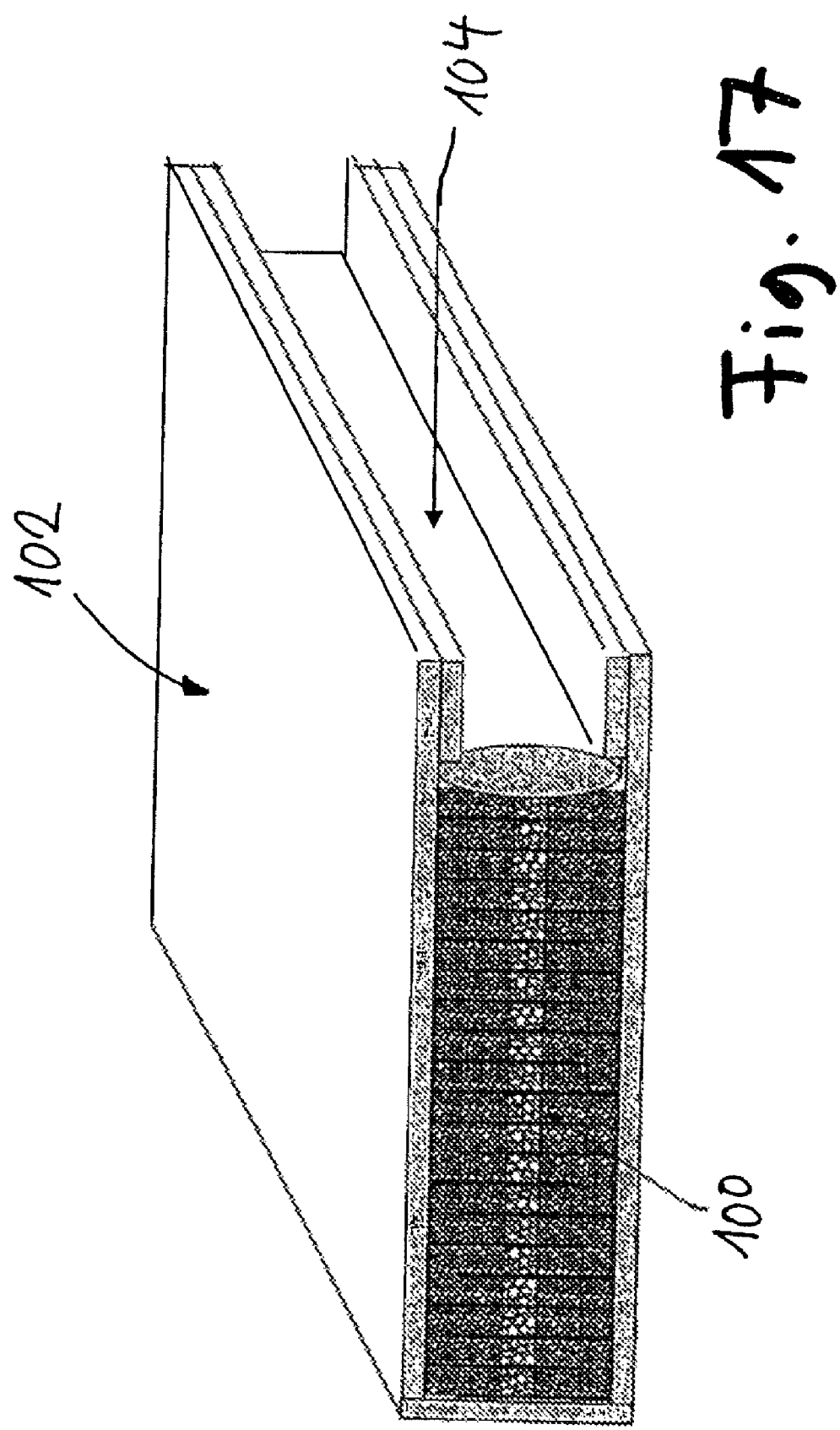
FIG. 17 shows a section through a sorption pipe with a pressed, pleated sandwich structure.

FIG. 17 shows an example of how this folded adsorber structure can also be compressed, for example within a sorption pipe, in order to achieve a higher packing density of adsorbent material. In this context, a type of piston bar is provided with which a certain degree of pressure can be applied to the adsorber structure. This bar can be secured by bonding, soldering, welding or by other connecting techniques. By virtue of the regions of increased permeability to vapor it is possible to dispense with additional flow ducts so that the entire cross section of the sorption pipe can be filled with the structure.

Figure 18:
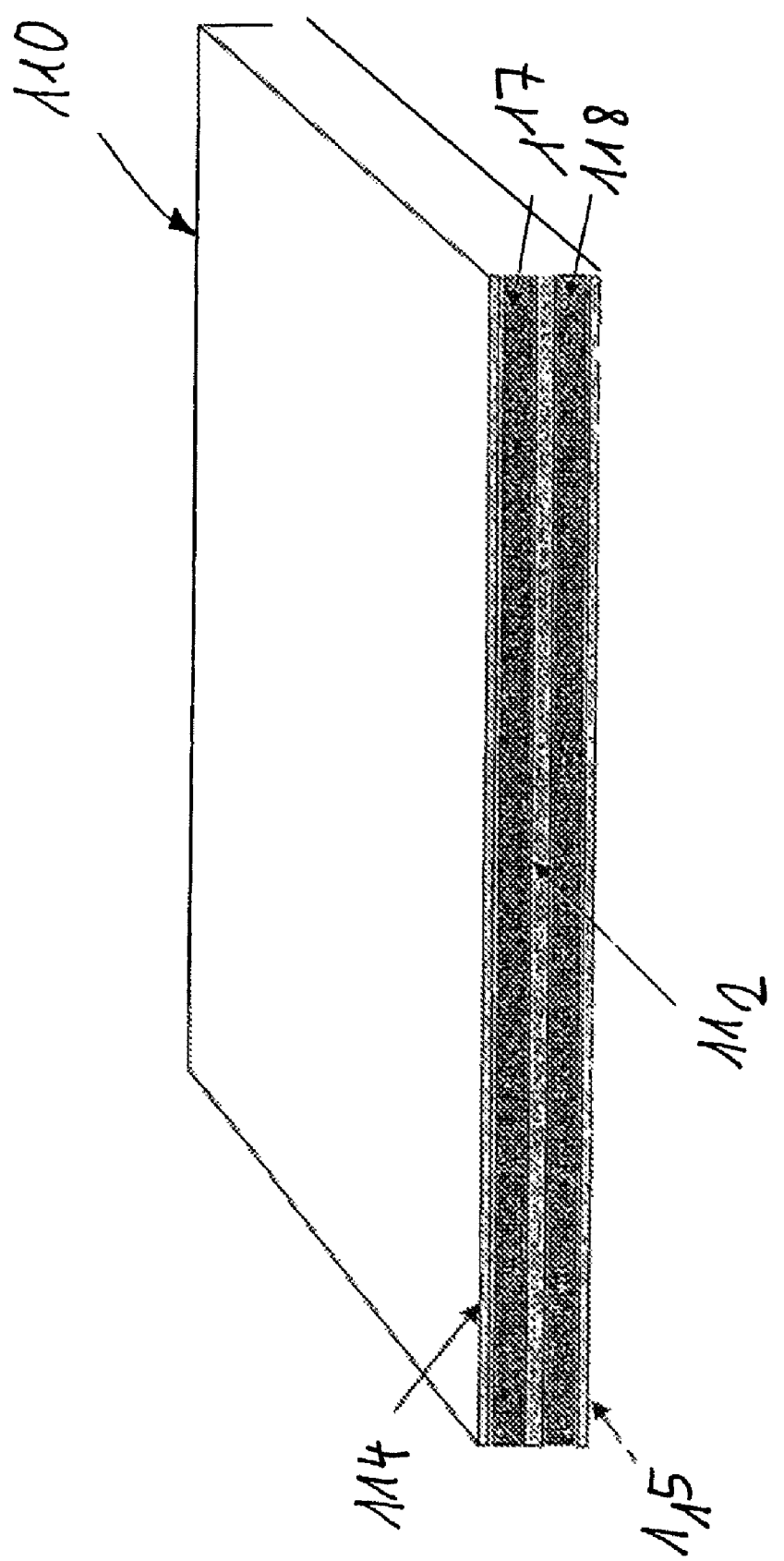
FIG. 18 shows a 5-layer sandwich structure which is characterized by an additional porous intermediate layer for increasing the axial permeability to vapor and by breakthroughs in the thermally conductive cover foils.

FIG. 18 illustrates a 5-layer sandwich structure which comprises an intermediate layer which improves the axial transport of vapor further. The adsorbent mass located between the thermally conductive foils is formed in this case by three layers, the two outermost of which can be formed, for example, from a very dense activated carbon woven fabric with a high absorption capacity, and the middle layer can be formed from an axially very permeable woven fabric which essentially brings about the mass transfer into the depth of the pleated structure which is formed therefrom.

FIG. 19 illustrates an alternative design and an associated possible fabrication method of a laminated ribbon 121 from which a particularly preferred adsorber structure can be manufactured with relatively simple means. The laminate ribbon 121 is manufactured by laminating two preferably extruded pasty adsorber layers 122, 123 onto a planar metal structure 124 which is a good conductor of heat. The doughy adsorber masses are composed here of a suitable mixture of adsorber particles and binders. Optionally, thermally conductive particles for forming a thermally conductive meso structure and, if appropriate, further additives which are not specified in more detail may also be included. In a way which is not illustrated in more detail, the middle metal ribbon can have breakthroughs and/or bulges by means of which the two pasty adsorber masses can be connected to one another and to the planar metal carrier structure during the lamination process. As a result, the mutual adhesion of the three layers to one another is improved. Alternatively, the metal foil can also be treated chemically or mechanically, for example roughened, in advance in order to improve the adhesion.

The extruded adsorber layers 122, 123 each have a thickness of approximately 1 mm. The metal structure 124 is preferably formed by a copper foil which has a thickness of 0.05 mm. The copper foil is tin plated and optionally perforated. The lamination process is carried out, for example, using two lamination rollers 125, 126.

The lamination rollers 125, 126 preferably have expeller webs 127, 128 which are aligned transversely with the rolling direction on the surface and press into the still soft sorbent layers to form transverse channels or grooves 129 to 132. Some of the grooves 129, 120, 131, 132 can serve as predetermined bending points for the subsequent pleating process.

FIGS. 20 and 21 show side views of an adsorbent structure which is manufactured with the laminate ribbon 121. In a first step, a serpentine compact structure 133 is manufactured by pleating of the ribbon 121. As is indicated in the illustration in FIG. 20, the transverse grooves 129, 132 which are formed in the compacted structure by expulsion give rise to vapor ducts which function as a macro structure or meso structure for the mass transfer. In a fashion which cannot be seen here, this structure can also have bronchial branching in order to make the mass transfer as low in pressure loss as possible.

In the directly following step, as indicated in FIG. 21, the bumps in the meander are freed of the sorbent layer on each side by using a doctor blade, for example. In this state corresponding to FIG. 21, the compacted adsorber structures 133 can be finally cut to length and hardened.

Figure 22:
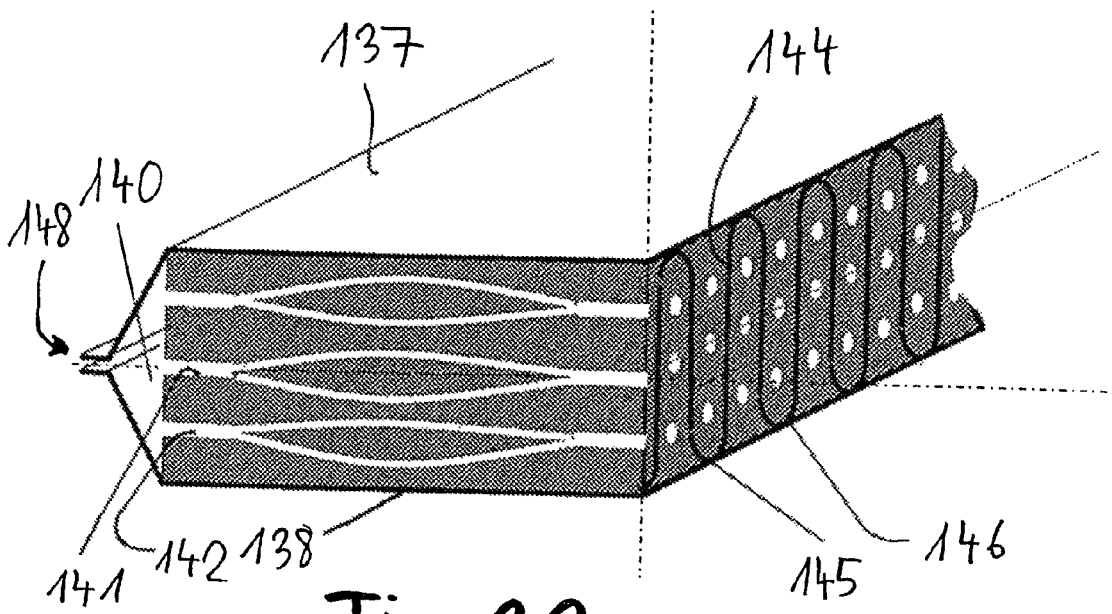
FIGS. 22 and 23 show sectional partial views of a sorption pipe with preferred adsorber structures.
Figure 23:
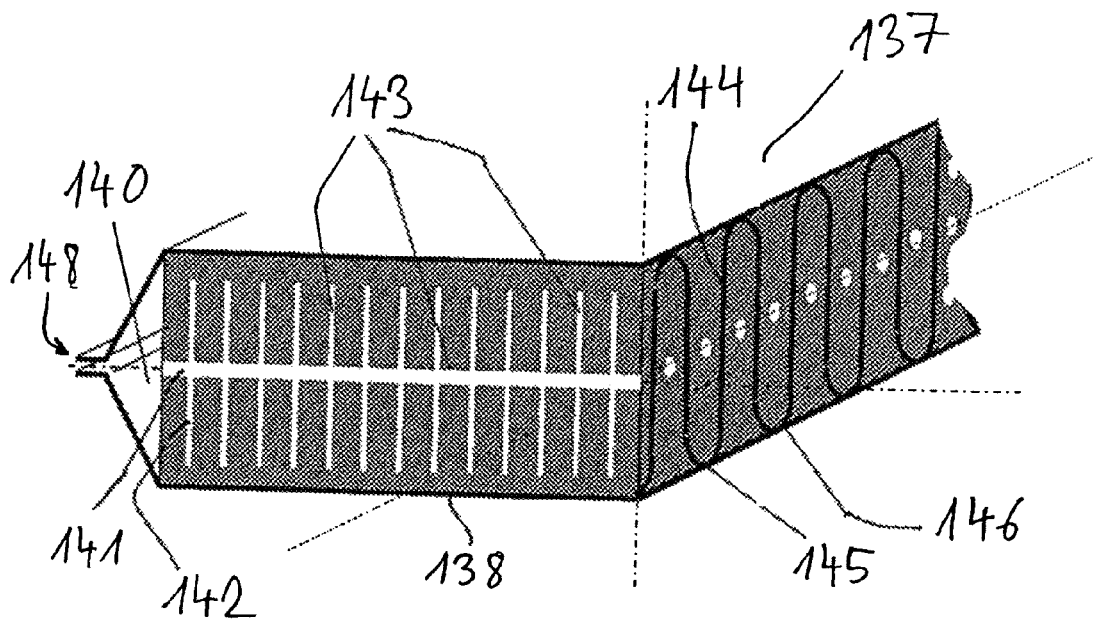

FIGS. 22 and 23 show sectional partial views of a sorption pipe or reaction pipe 136 which is equipped with the correspondingly fabricated adsorber structure between the fluid walls 137, 138. FIGS. 22 and 23 show two exemplary profiles of branched meso-duct structures with a main duct 140 and secondary ducts 141, 142, 143 for mass transfer. As a result of the alternating position of levels for the duct structures and of the metallic macro thermally conductive layers which are also embedded in the adsorbent material, the transport paths for the flow of heat and material which are subject to loss are short and can be easily optimized by adapting easily variable structural parameters.

For the thermally conductive connection, indicated by 145 and 146, of the metal foils 144 to the fluid walls 137, 138 it is possible to use not only bonding but also soldering or welding methods, which are to be preferred. A particularly preferred method is a low-flux soldering method (not specified in more detail here) in which a layer of solder with a low melting point which is applied to the inside of the fluid wall 137, 138 and/or to the metallic carrier layer 144 is melted on and connected to the other party to the soldering process in a materially joined fashion. The state before the welding tight, in particular laser welding, is indicated by 148.

It is also to be noted that the planar, structure-forming adsorbent layers can be formed from any desired mixtures of adsorbent material and additives.

The invention claimed is:

1. A sorber heat exchanger wall having a fluid side to which a heat-emitting or heat-absorbing fluid is applied and which is bounded by a fluid wall, and a sorption side which has a sorption bed with a sorbent which accumulates a sorbate while absorbing or emitting heat, wherein the sorption bed comprises a supporting structure for the sorbent which is a good conductor of heat and which is connected to the fluid wall in a thermally conductive fashion, wherein the sorption bed is formed by a pleated sandwich structure, wherein the sandwich structure is composed of two thermally conductive cover layers and at least one intermediate sorbent structure and wherein the thermally conductive cover layers have breakthroughs, and in the pleated state they form thermally conductive supporting structures.

2. The sorber heat exchanger wall as claimed in claim 1, wherein the thermally conductive supporting structure comprises a thermally conductive macro supporting structure.

3. The sorber heat exchanger wall as claimed in claim 2, wherein the macro supporting structure comprises an expanded metal mesh, a wire mesh and/or a perforated, in particular slotted, or nonperforated metal foil.

4. The sorber heat exchanger wall as claimed in claim 2, wherein the macro supporting structure comprises an expanded metal mesh with meshes which have a long axis of symmetry and a short axis of symmetry.

5. The sorber heat exchanger wall as claimed in claim 4, wherein the long axis of the meshes extends perpendicularly with respect to the fluid wall.

6. The sorber heat exchanger wall as claimed in claim 4, wherein the meshes have a web width of less than 1 mm, in particular of less than 0.5 mm.

7. The sorber heat exchanger wall as claimed in claim 4, wherein the expanded metal mesh is formed from a ribbon material which has a thickness of less than 0.5 mm.

8. The sorber heat exchanger wall as claimed in claim 7, wherein the ribbon material contains at least a copper and/or aluminum alloy.

9. A sorber heat exchanger having at least one sorber heat exchanger wall as claimed in claim 1.

10. The sorber heat exchanger wall as claimed in claim 4, wherein the expanded metal mesh is formed from a ribbon material which has a thickness of less 0.2 mm.

11. The sorber heat exchanger wall as claimed in claim 4, wherein the expanded metal mesh is formed from a ribbon material which has a thickness of less 0.1 mm.

12. A sorber heat exchanger having at least one sorber heat exchanger wall having a fluid side to which a heat-emitting or heat-absorbing fluid is applied and which is bounded by a fluid wall, and a sorption side which has a sorption bed with a sorbent which accumulates a sorbate while absorbing or emitting heat, wherein the sorption bed comprises a supporting structure for the sorbent which is a good conductor of heat and which is connected to the fluid wall in a thermally conductive fashion, the sorber heat exchanger being embodied as at least one hermetically sealed sorption pipe with an adsorption/desorption and a vaporization/condensation zone.

13. The sorber heat exchanger as claimed in claim 12, wherein the vaporization/condensation zone is permeated by a capillary structure.

14. The sorber heat exchanger as claimed in claim 12, wherein the at least one sorption pipe is formed from two half-shells which can be connected hermetically to one another.

* * * * *